(12) United States Patent
King et al.

(10) Patent No.: US 9,251,315 B2
(45) Date of Patent: Feb. 2, 2016

(54) SECURITY KEY MANAGEMENT BASED ON SERVICE PACKAGING

(75) Inventors: William C. King, Lafayette, CA (US);
Bjorn Hjelm, Livermore, CA (US);
Kent A. McCullough, Albuquerque, NM (US); Loc B. Vo, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 13/315,398

(22) Filed: Dec. 9, 2011

(65) Prior Publication Data
US 2013/0152208 A1    Jun. 13, 2013

(51) Int. Cl.
*G06F 21/00* (2013.01)
*H04L 29/08* (2006.01)

(52) U.S. Cl.
CPC .............. *G06F 21/00* (2013.01); *H04L 67/00* (2013.01)

(58) Field of Classification Search
CPC ....................................................... G06F 21/00
USPC ................................................. 726/14, 26–29
See application file for complete search history.

(56) References Cited

U.S. PATENT DOCUMENTS

| | | | | |
|---|---|---|---|---|
| 7,908,297 B2 * | 3/2011 | Waldman | ................. | G06F 3/048 707/803 |
| 8,037,522 B2 | 10/2011 | Holtmanns et al. | | |
| 8,260,259 B2 | 9/2012 | Semple et al. | | |
| 8,484,467 B2 | 7/2013 | Chan et al. | | |
| 8,543,814 B2 | 9/2013 | Laitinen et al. | | |
| 2005/0102501 A1 * | 5/2005 | Haukka et al. | ................. | 713/155 |
| 2006/0205388 A1 | 9/2006 | Semple et al. | | |
| 2007/0074275 A1 * | 3/2007 | Bajko et al. | ....................... | 726/4 |
| 2007/0204160 A1 | 8/2007 | Chan et al. | | |
| 2008/0171534 A1 | 7/2008 | Holtmanns et al. | | |
| 2009/0132806 A1 | 5/2009 | Blommaert et al. | | |
| 2009/0180614 A1 * | 7/2009 | Rajagopal et al. | ............. | 380/228 |
| 2009/0325713 A1 * | 12/2009 | Cansler et al. | ................... | 463/42 |
| 2010/0174911 A1 * | 7/2010 | Isshiki | ..................... | G06F 21/31 713/182 |
| 2010/0281262 A1 | 11/2010 | Cheng et al. | | |
| 2011/0320802 A1 | 12/2011 | Wang et al. | | |
| 2012/0204231 A1 | 8/2012 | Holtmanns et al. | | |
| 2013/0117824 A1 | 5/2013 | Naslund et al. | | |
| 2014/0237230 A1 * | 8/2014 | Lehnhardt | ........... | G06F 21/6218 713/165 |

OTHER PUBLICATIONS

Data management in grid applications providers, Del-Fabbro et al, IEEE, 2005.*
A secured delegation of remote services on IPv6 home networks, Preda et al, IEEE, 2009.*

(Continued)

*Primary Examiner* — Luu Pham
*Assistant Examiner* — Jahangir Kabir (57) ABSTRACT

A device receives application information associated with applications provided by a network, and determines service package identifiers for one or more applications identified in the application information. The device also receives information associated with devices and subscribers of the network, and determines security key parameters based on the information associated with the devices and the subscribers of the network. The device further generates, based on the security key parameters, a security key for each of the service package identifiers.

21 Claims, 8 Drawing Sheets

(56) References Cited

OTHER PUBLICATIONS

"3rd Generation Partnership Project; Technical Specification Group Services and System Aspects; Key establishment between a Universal Integrated Circuit Card (UICC) and a terminal (Release 10)", 3GPP TS 33.110 V10.1.0, http://www.3gpp.org, Jun. 2011, 28 pages.

Lakshmi, et al., "JPermit: Usable and Secure Registration of Guest-Phones into Enterprise VoIP Network," International Conference on Advances in Computer Engineering (ACE), pp. 115-119, Jun. 20-21, 2010.

Tootoonchian, et al., "Lockr: Better Privacy for Social Networks," Proceedings of the 5th International Conference on Emerging Networking Experiments and Technologies (CoNEXT '09), pp. 169-180, Dec. 1-4, 2009.

* cited by examiner

FIG. 6

SECURITY KEY MANAGEMENT BASED ON SERVICE PACKAGING

BACKGROUND

A service provider is an entity (e.g., a business or an organization) that sells bandwidth of or access to a network (e.g., the Internet, a data network, a telecommunication network, etc.) associated with the service provider. Service providers may include telecommunications companies, data carriers, wireless communications providers, Internet service providers, cable television operators offering high-speed Internet access, etc. Service provider networks enable third party application developers to create applications that use network resources, such as location systems that determine locations of mobile communication devices. These applications make requests to a network device, such as a gateway. The network device processes the requests and sends the requests to service provider systems that provide services, such as determining the locations of mobile communication devices, messaging, and/or other services. Such service provider systems may be referred to as enablers.

The service provider network defines application programming interfaces (APIs) for third party application developers to access the capabilities of enablers in the service provider network. A third party application often needs to authenticate a person (i.e., an end user) using the third party application, and often provides some form of authentication of the end user. However, in many cases, it is preferable to have the service provider network perform this function on behalf of the third party application. For example, if a developer would like the service provider to bill for an end user's use of the developer's application, the service provider network needs to authenticate the end user of the application. The third party application not only needs to identify the end user, but also needs to receive a level of assurance for that identification.

The generic bootstrapping architecture (GBA) is a technology that enables authentication of a user, of a mobile communication device, for using third party applications and/or network resources. In the GBA, user authentication is instantiated via a security key (e.g., a GBA key) that may be provided in a Universal Integrated Circuit Card (UICC) of the mobile communication device and in another network device, such as a network application function (NAF). The GBA may authenticate the user, for using an application, by requesting the security key from the UICC and from the NAF, and by verifying that the security keys match each other.

Security keys may be generated for each third party application, and may be based on a variety of parameters. For example, the 3rd Generation Partnership Project (3GPP) Technical Specification (TS) 33.110 specifies that the GBA Ks_local key generation may depend on the following parameters: an Integrated Circuit Card Identification (ICCID); a Bootstrapping Transaction Identifier (B-TID); a random (RAND) challenge generated by a Home Location Register (HLR); a user equipment (UE) identifier (e.g., a mobile equipment identifier (MEID), an International Mobile Equipment Identity (IMEI), etc.); a UE application identifier; a UE UICC identifier; a counter limit; etc. The GBA key may be customized to a specific application, for a specific UE, for a specific UICC, for a specific Long Term Evolution (LTE) session, using a specific network challenge value, etc. However, security key customization and proliferation makes security key management complex, difficult, and expensive for service providers since an overwhelming number security keys are generated for applications.

DETAILED DESCRIPTION OF PREFERRED EMBODIMENTS

The following detailed description refers to the accompanying drawings. The same reference numbers in different drawings may identify the same or similar elements.

Systems and/or methods described herein may simplify management of security keys (e.g., GBA keys) used for a variety of applications and/or services provided by a variety of networks (e.g., LTE networks, High Rate Packet Data (HRPD) networks, enhanced HRPD (eHRPD) networks, Evolution Data Optimized (1xEV-DO) networks, etc.). In one example implementation, the systems and/or methods may simplify management of security keys by grouping one or more applications into a specific service package, and generating a security key for the specific service package rather than for each application. For example, the systems and/or methods may group certain applications offered to subscribers (e.g., voice over Internet protocol (VoIP) applications) into a service package, and may group other applications (e.g., messaging applications, video applications, gaming applications, music applications, network offload applications, etc.) into corresponding service packages. Alternatively, or additionally, the systems and/or methods may group one or more different applications (e.g., VoIP applications and gaming applications) into a single service package. The systems and/or methods may generate a security key for each of the generated service packages.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "user" and "subscriber" may be used interchangeably. Also, the terms "user" and "subscriber" are intended to be broadly interpreted to include a user device or a user of a user equipment (UE).

Figure 1:
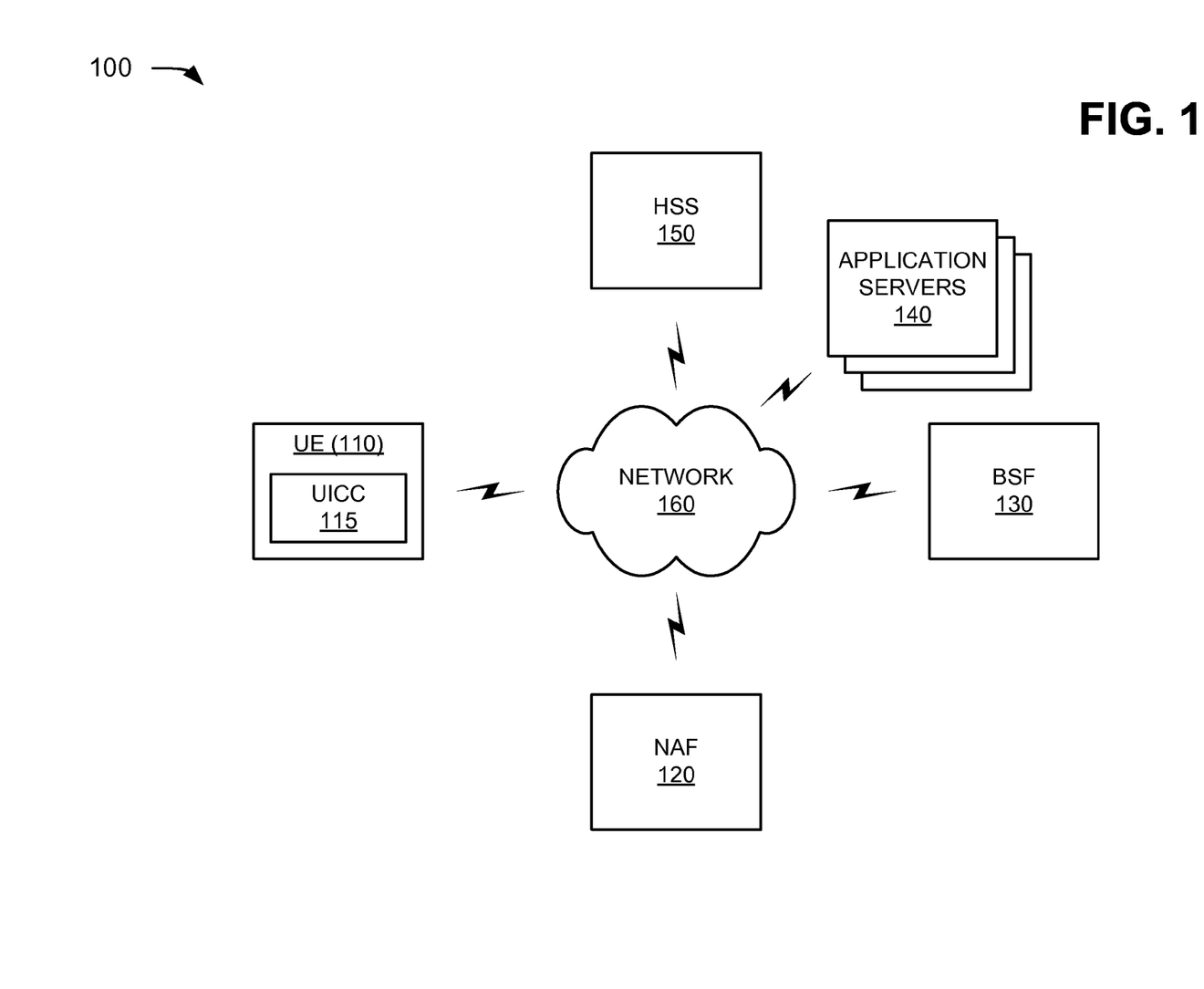
FIG. 1 is a diagram of an example network in which systems and/or methods described herein may be implemented.

FIG. 1 is a diagram of an example network 100 in which systems and/or methods described herein may be implemented. As illustrated, network 100 may include a user equipment (UE) 110 with a UICC 115, a network application function (NAF) device 120, a bootstrapping server function (BSF) device 130, one or more application servers 140, and a home subscriber server (HSS) 150 interconnected by a network 160. Components of network 100 may interconnect via wired and/or wireless connections or links A single UE 110, UICC 115, NAF 120, BSF 130, application server 140, HSS 150, and network 160 have been illustrated in FIG. 1 for simplicity. In practice, there may be more UEs 110, UICCs 115, NAFs 120, BSFs 130, application servers 140, HSSs 150, and/or networks 160.

UE 110 may include any device that is capable of communicating with NAF 120, BSF 130, application servers 140, and/or HSS 150 via network 160. For example, UE 110 may include a mobile computation and/or communication device, such as a radiotelephone, a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smartphone; a laptop computer with a wireless air card; a global positioning system (GPS) device; a content recording device (e.g., a camera, a video camera, etc.); a set-top box (STB); a VoIP device; an analog terminal adaptor (ATA): etc. Alternatively, or additionally, UE 110 may include a fixed (e.g., provided in a particular location, such as within a user's home) computation and/or communication device, such as a laptop computer, a personal computer, a tablet computer, a STB, a television, a gaming system, etc.

In one example implementation, UE 110 may include UICC 115 that communicates with BSF 130 to perform authentications of UE 110. Alternatively, UICC 115 may be replaced with an external storage device, such as a Subscriber Identity Module (SIM) card, an external hard drive, a flash memory data storage device, etc. UICC 115 may incorporate GBA functions needed for generation and/or storage of application session security keys through bootstrapping procedures.

NAF 120 may include one or more server devices, or other types of computation and/or communication devices, that gather, process, search, and/or provide information in a manner described herein. In an example implementation, NAF 120 may refer an unknown UE 110 to BSF 130 when the unknown UE 110 is attempting access to an application or service provided by application server 140. UE 110 and BSF 130 may agree on a session key to be used for encrypted data exchange with NAF 120. When UE 110 re-connects to BSF 130, NAF 120 may obtain the session key as well as user specific data from BSF 130 and may begin data exchange with UE 110 using the related session keys for encryption.

BSF 130 may include one or more server devices, or other types of computation and/or communication devices, that gather, process, search, and/or provide information in a manner described herein. In one example, BSF 130 may provide application independent functions for mutual authentication of UE 110 and other devices unknown to each other and for bootstrapping an exchange of secret session keys.

In one example implementation, NAF 120 and/or BSF 130 may receive information associated with applications provided by network 100 (e.g., via application servers 140), and may determine service package identifiers for portions of the applications identified in the applications information. NAF 120/BSF 130 may receive information associated with other devices (e.g., other UEs 110) and/or subscribers of network 100, and may determine other security key parameters based on the devices/subscribers information. NAF 120/BSF 130 may generate a security key for each service package identifier based on the other security key parameters, and may store the generated security keys in a storage device associated with NAF 120/BSF 130. NAF 120/BSF 130 may provide particular security keys to particular UEs 110.

Application server 140 may include one or more server devices, or other types of computation or communication devices, that gather, process, search, and/or provide information in a manner described herein. In an example implementation, application server 140 may store one or more third party applications that use resources provided by a service provider network, which may include NAF 120, BSF 130, and/or HSS 150. The third party applications may include applications that determine locations of mobile communication devices (e.g., UE 110), applications that connect calls between UE 110 and other UEs 110, voicemail applications, messaging applications, video applications, etc. The third party applications, via application server 140, may provide services to users associated with UE 110, may make authentication requests to BSF 130, and may make requests for other services to other devices associated with the service provider network. The third party applications, via application server 140, may receive responses to such requests from BSF 130. Alternatively, or additionally, one or more of the third party applications may be permanently stored on UE 110 or may be retrieved from application server 140 and temporarily stored on UE 110.

HSS 150 may include one or more server devices, or other types of computation and/or communication devices, that gather, process, search, and/or provide information in a manner described herein. In an example implementation, HSS 150 may include one or more user databases that support network entities that handle calls. The one or more databases of HSS 150 may include subscription-related information (e.g., subscriber profiles). HSS 150 may perform authentication and authorization of a user, and may provide information about the user's (e.g., UE's 110) profile and subscriptions.

Network 160 may include a local area network (LAN), a wide area network (WAN), a metropolitan area network (MAN), a telephone network, such as the Public Switched Telephone Network (PSTN), an intranet, the Internet, an optical fiber or fiber optic-based network, or a combination of networks. In one example implementation, network 160 may enable UE 110 to communicate with one or more of NAF 120, BSF 130, application servers 140, and/or HSS 150.

Although FIG. 1 shows example components of network 100, in other implementations, network 100 may contain fewer components, different components, differently arranged components, or additional components than depicted in FIG. 1. Alternatively, or additionally, one or more of the components of network 100 may perform one or more functions described as being performed by another one or more of the components of network 100.

Figure 2:
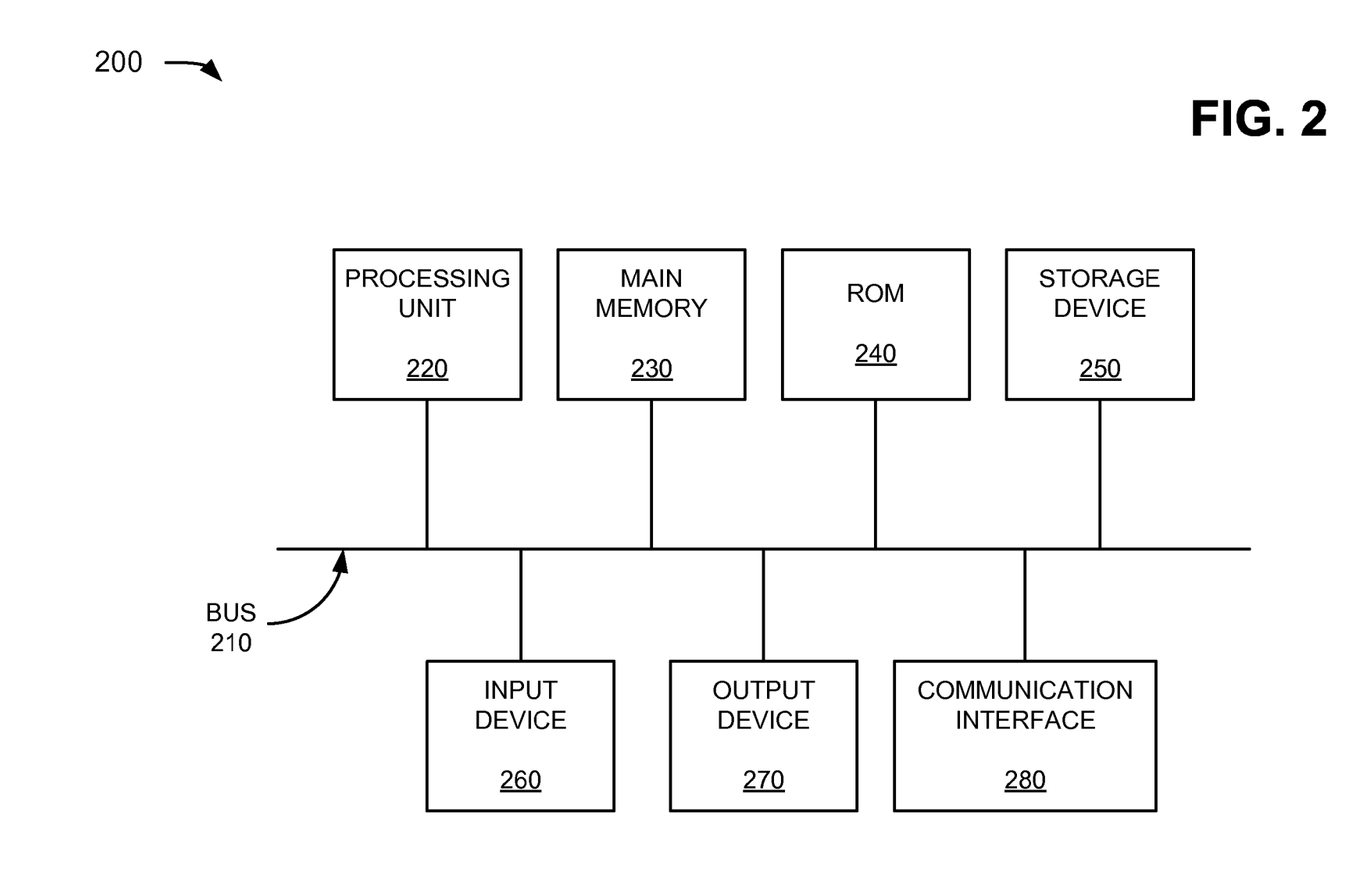
FIG. 2 is a diagram of example components of one or more devices of the network illustrated in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
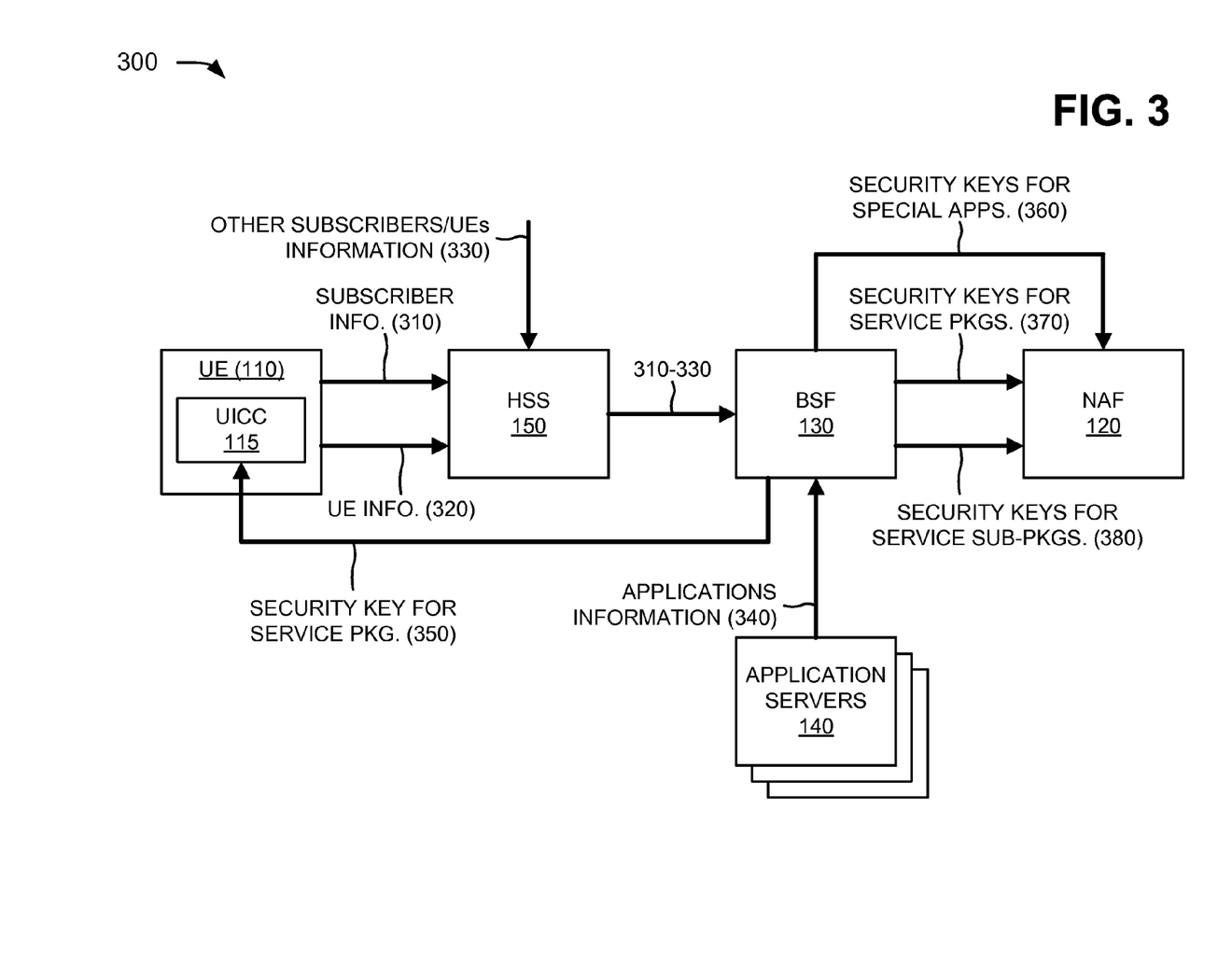
FIG. 3 is a diagram of example operations capable of being performed by an example portion of the network illustrated in FIG. 1.

FIG. 3 is a diagram of example operations capable of being performed by an example portion 300 of network 100. As shown in FIG. 3, network portion 300 may include UE 110, NAF 120, BSF 130, application servers 140, and HSS 150. UE 110, NAF 120, BSF 130, application servers 140, and HSS 150 may include the features described above in connection with one or more of, for example, FIGS. 1 and 2.

As further shown in FIG. 3, UE 110 may provide subscriber information 310 and UE information 320 to HSS 150, and HSS 150 may receive subscriber information 310 and UE information 320. Subscriber information 310 may include information associated with a user (e.g., of UE 110), such as a subscriber identification, a subscriber name, a subscriber address, subscriber account information, etc. UE information 320 may include an identifier of UE 110 (e.g., a MEID, IMEI, etc.); attachment point information (e.g., a connection point of UE 110 to network 160); a geographical location of UE 110; a zip code associated with UE 110; a type (e.g., a brand, a manufacturer, etc.) of UE 110; UE 110 capabilities (e.g., a screen size of UE 110, whether UE 110 can display high definition (HD) or three-dimensional (3D) content, etc.); etc. HSS 150 may also receive other subscribers/UEs information 330, such as information (e.g., metadata) about other UEs 110, users of other UEs 110, connection points of other UEs 110 (e.g., to network 160), etc.

HSS 150 may store subscriber information 310, UE information 320, and/or other subscribers/UEs information 330 in one or more subscriber profiles provided in a storage device (e.g., storage device 250, FIG. 2). HSS 150 may provide subscriber information 310, UE information 320, and/or other subscribers/UEs information 330 to BSF 130, and BSF may receive information 310-330. Alternatively, or additionally, BSF 130 may retrieve information 310-330 from HSS 150, or may receive/retrieve the one or more subscriber profiles from HSS 150 instead of information 310-330. As further shown in FIG. 4, application servers 140 may provide applications information 340 to BSF 130, and BSF 130 may receive applications information 340. Applications information 340 may include information associated with applications that determine locations of mobile communication devices (e.g., UE 110), applications that connect calls between UE 110 and other UEs 110, voicemail applications, messaging applications, video applications, and/or any other applications, services, and/or network resources provided by a service provider for one or more networks.

BSF 130 may group one or more applications, identified in applications information 340, into a service package to be provided to one or more users (e.g., UEs 110). For example, BSF 130 may group a voicemail application, a messaging application, a calling plan, and billing resources for a particular user into a service package for the particular user. In another example, BSF 130 may group television services, on-demand services, and Internet services for another user into a service package for the other user. BSF 130 may associate an identifier (e.g., referred to herein as a service package identifier (ID)) with each service package created by BSF 130 for one or more applications. The service package IDs of the service packages may be used as security key parameters for a Key Derivation Function (KDF) of BSF 130 when generating security keys (e.g., GBA keys) for the service packages.

Alternatively, or additionally, BSF 130 may define service sub-packages for one or more service packages. A service sub-package may include some of the applications defined in a service package. Using the example above, the service package that includes the voicemail application, the messaging application, the calling plan, and the billing resources may be divided in a first service sub-package that includes the voicemail application and the messaging application. The service package may be further divided into a second service sub-package that includes the calling plan and the billing resources. BSF 130 may associate a service sub-package ID with each service sub-package created by BSF 130. The service sub-package IDs of the service sub-packages may be used as security key parameters for the KDF of BSF 130 when generating security keys (e.g., GBA keys) for the service sub-packages.

Alternatively, or additionally, BSF 130 may designate certain applications as special applications that are not grouped into a service package or a service sub-package. For example, BSF 130 may designate a secure voice over LTE (VoLTE) application as a special application that is to be authenticated and/or authorized alone rather than via a service package or service sub-package. BSF 130 may associate a special application ID with each special application designated by BSF 130. The special application IDs for the special applications may be used as security key parameters for the KDF of BSF 130 when generating security keys (e.g., GBA keys) for the special applications.

BSF 130 may determine other security key parameters for the KDF based on subscriber information 310, UE information 320, and/or other subscribers/UEs information 330. For example, BSF 130 may utilize a UE identifier as a security key parameter that causes BSF 130 to create a security key that is valid for a specific UE 110. Such a security key may become invalid when a subscriber switches UICC 115 to a UE (e.g., with a different MEID or IMEI) other than the specific UE 110.

BSF 130 may generate a security key (e.g., a GBA key) for each service package ID based on the determined other security key parameters. In one example implementation, BSF 130 may generate a security key for a service package associated with UICC 115 of UE 110, and may provide the security key to UICC 115, as indicated by reference number 350. Alternatively, or additionally, BSF 130 may generate security keys for each of the special applications designated by BSF 130, and may provide the security keys for the special applications to NAF 120, as indicated by reference number 360. Alternatively, or additionally, BSF 130 may generate security keys for the service packages defined by BSF 130, and may provide the security keys for the service packages to NAF 120, as indicated by reference number 370. Alternatively, or additionally, BSF 130 may generate security keys for the service sub-packages defined by BSF 130, and may provide the security keys for the service sub-packages to NAF 120, as indicated by reference number 380. In one example, security key 350 may be included in security keys 360, security keys 370, or security keys 380.

NAF 120 may receive security keys 360 for the special applications, security keys 370 for the service packages, and security keys 380 for the service sub-packages, and may store security keys 360-380 in a storage device (e.g., storage device 250, FIG. 2) referred to as a NAF Key Center. Alternatively, or additionally, BSF 130 may store security keys 360-380 in a storage device (e.g., storage device 250, FIG. 2) associated with BSF 130. Although not shown in FIG. 3, BSF 130 and/or NAF 120 may provide one or more of security keys 360-380 to one or more UICCs 115 associated with one or more UEs 110.

The arrangement depicted in FIG. 3 may vastly reduce the number of security keys (e.g., GBA keys) required to be generated, stored, tracked, and/or managed across network 100 and network 100 elements. The arrangement depicted in FIG. 3 may also facilitate management of provisioning and/or billing requirements across network 100 and network 100 elements. Furthermore, the arrangement depicted in FIG. 3 may simplify application or service authorization and authentication using the GBA since a single security key may used to authenticate and authorize multiple applications grouped in a service package.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300. For example, NAF 120 may perform one or more tasks described as being performed by BSF 130.

Figure 4:
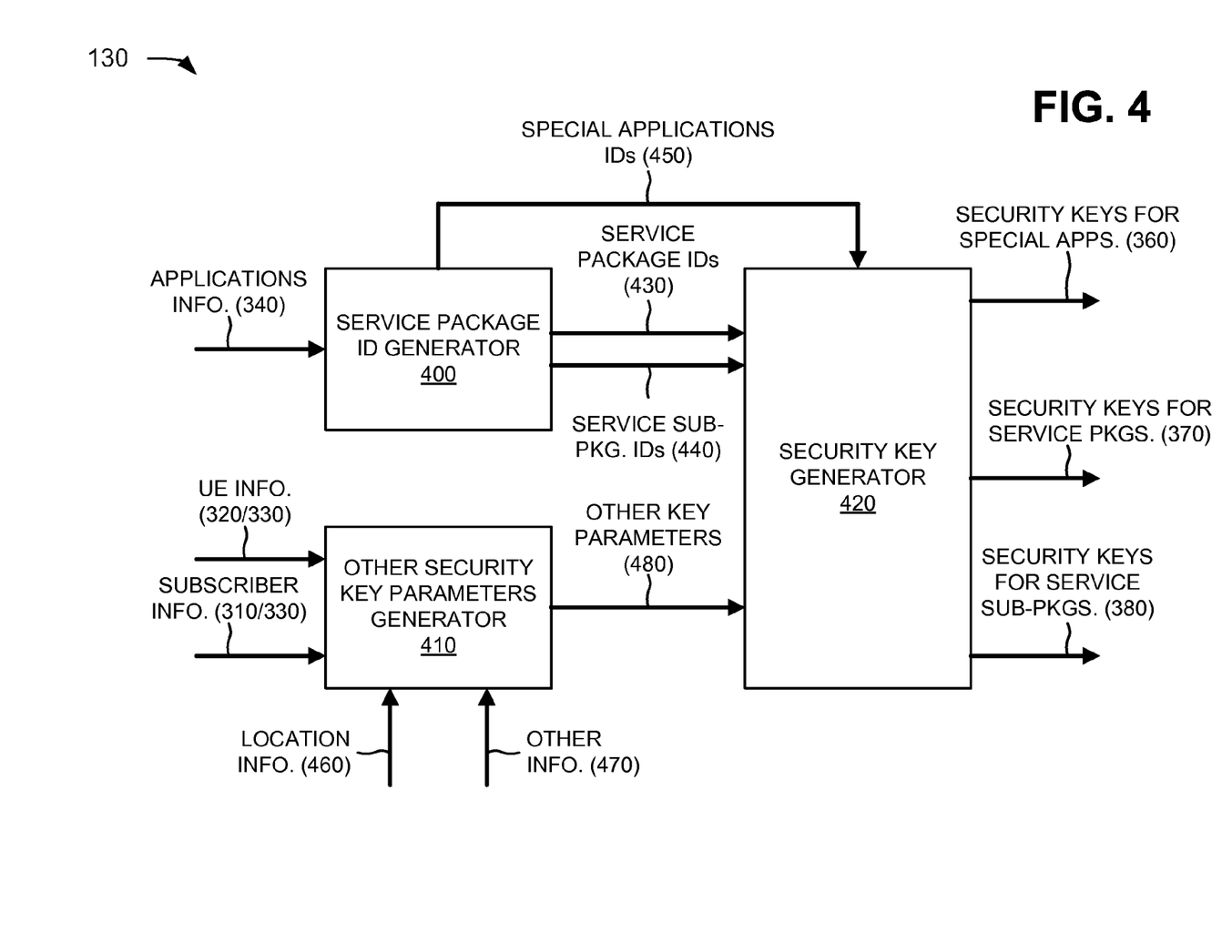
FIG. 4 is a diagram of example functional components of a bootstrapping server function (BSF) device depicted in the network of FIG. 1.

FIG. 4 is a diagram of example functional components of BSF 130. In one implementation, the functions described in connection with FIG. 4 may be performed by one or more components of device 200 (FIG. 2) or by one or more devices 200. As shown in FIG. 4, BSF 130 may include a service package ID generator 400, other security key parameters generator 410, and a security key generator 420.

Service package ID generator 400 may receive applications information 340 from applications servers 140 (not shown), and may group one or more applications into one or more service packages based on applications information 340. In one example, service package ID generator 400 may define the service packages based on a data plan of a user, a family plan of a user, etc. for purposes of billing. Service package ID generator 400 may associate identifiers or tags (e.g., service package IDs 430) with the service packages defined by service package ID generator 400 for one or more applications. As further shown in FIG. 4, service package ID generator 400 may provide service package IDs 430 to security key generator 420.

Service package ID generator 400 may group one or more applications into one or more service sub-packages based on applications information 340. In one example, service package ID generator 400 may define the service sub-packages as portions of the service packages defined by service package ID generator 400. Service package ID generator 400 may associate identifiers or tags (e.g., service sub-package IDs 440) with the service sub-packages defined by service package ID generator 400. As further shown in FIG. 4, service package ID generator 400 may provide service sub-package IDs 440 to security key generator 420.

Service package ID generator 400 may designate one or more applications as special applications based on applications information 340. In one example, service package ID generator 400 may define a special application as an application that may require a single security key due to an importance of the application. Service package ID generator 400 may associate identifiers or tags (e.g., special applications IDs 450) with the special applications defined by service package ID generator 400. As further shown in FIG. 4, service package ID generator 400 may provide special applications IDs 450 to security key generator 420.

Other security key parameters generator 410 may receive subscriber information 310, UE information 320, and/or other subscribers/UEs information 330. As further shown in FIG. 4, other security key parameters generator 410 may receive location information 460 and other information 470. Location information 460 may include information associated with physical locations (e.g., GPS locations) of one or more UEs 110. Other information 470 may include information obtained from accounting systems, billing systems, marketing systems, etc. associated with network 100. Other security key parameters generator 410 may determine other security key parameters 480 based on subscriber information 310, UE information 320, other subscribers/UEs information 330, location information 460, and/or other information 470. Other security key parameters 480 may include, for example, ICCIDs, B-TIDs, RAND challenges, counter limits, etc. As further shown in FIG. 4, other security key parameters generator 410 may provide other security key parameters 480 to security key generator 420.

Security key generator 420 may include a KDF that utilizes parameters, such as other key parameters 480, to generate security keys (e.g., GBA keys). Security key generator 420 may receive service package IDs 430, service sub-package IDs 440, and special applications IDs 450 from service package ID generator 400, and may receive other key parameters 480 from other security key parameters generator 410. Security key generator 420 may utilize one or more of service package IDs 430, service sub-package IDs 440, special applications IDs 450, and other key parameters 480 to generate security keys for authenticating UEs 110 and/or UICCs 115 to utilize one or more applications.

In one example, security key generator 420 may generate security keys 360 (e.g., GBA keys) for the special applications defined by BSF 130, based on special applications IDs 450 and other security key parameters 480. For example, if BSF 130 defined a secure VoLTE application as a special application, security key generator 420 may generate a security key specifically for the secure VoLTE application.

Alternatively, or additionally, security key generator 420 may generate security keys 370 (e.g., GBA keys) for the service packages defined by BSF 130, based on service package IDs 430 and other security key parameters 480. Each security key 370 may enable authentication and authorization of all applications or services associated with the service package defined by the corresponding service package ID 430. In one example, each security key 370 may be all that is needed for generic applications/services authentication and authorization in a LTE network utilizing UICCs 115.

Alternatively, or additionally, security key generator 420 may generate security keys 380 (e.g., GBA keys) for the service sub-packages defined by BSF 130, based on service sub-package IDs 440 and other security key parameters 480. Each security key 380 may enable authentication and authorization of all applications or services associated with the service sub-package defined by the corresponding service sub-package ID 440.

In one example, any of security keys 360-380 may be made valid for a specific UE 110 by incorporating a terminal ID (e.g., a UE 110 ID) in the parameters considered by security key generator 420. For example, if a particular security key 370 is associated with a particular service package and is valid for UE 110, the particular service package may not be used by a subscriber when UICC 115 is installed in a different UE with a different MEID/IMEI than the MEID/IMEI of UE 110. However, the particular service package may be enabled for the subscriber's different UE via an activation process.

In another example, if a service provider defines a standard service package with network offload (e.g., an enterprise LAN, a WiFi network, a WiMAX network, a home LAN, etc. with defined network offload triggers using predefined clients), then proper network offload behavior may be enabled for UE 110 through a new network element (e.g., an Access Network Discovery and Selection Function (ANDSF)). The service provider may generate a security key for a bundled Internet access, telephone, and television service of the home LAN, if so preferred by a subscriber, by modifying service package ID 430 or by adding a parameter associated with the bundled service.

In still another example, any of security keys 360-380 may be made valid for a specific location by incorporating location information in the parameters considered by security key generator 420. For example, a service provider can make a particular security key 370 for a particular service package valid only for a particular location. Any movement of UE 110/UICC 115 outside an area defined by the location information may result in a failure of authentication and authorization of the particular service package for UE 110/UICC 115. For example, the particular security key 370 may authorize a subscriber (e.g., via UE 110) to view a live broadcast of a sporting event while the subscriber and UE 110 are located within the stadium hosting the sporting event. If the subscriber/UE 110 leaves the stadium, the particular security key 370 may become invalid and the subscriber may be unable to view the live broadcast of the sporting event.

In one example implementation, tying a security key to a service package may provide simplicity since the single security key may used to authorize and/or authenticate UE 110 for applications and/or services defined by the service package. Tying the security key to the service package may also provide flexibility since a service provider may easily refine a service package by changing a service package ID. The service provider may provide other variations either by introducing new parameters in the KDF utilized by security key generator 420 or by creating different service packages, service sub-packages, and/or special applications. Either way, the number of security keys utilized by a service provider may be minimized.

Although FIG. 4 shows example functional components of BSF 130, in other implementations, BSF 130 may include fewer functional components, different functional components, differently arranged functional components, or additional functional components than depicted in FIG. 4. Alternatively, or additionally, one or more functional components of BSF 130 may perform one or more other tasks described as being performed by one or more other functional components of BSF 130.

Figure 5:
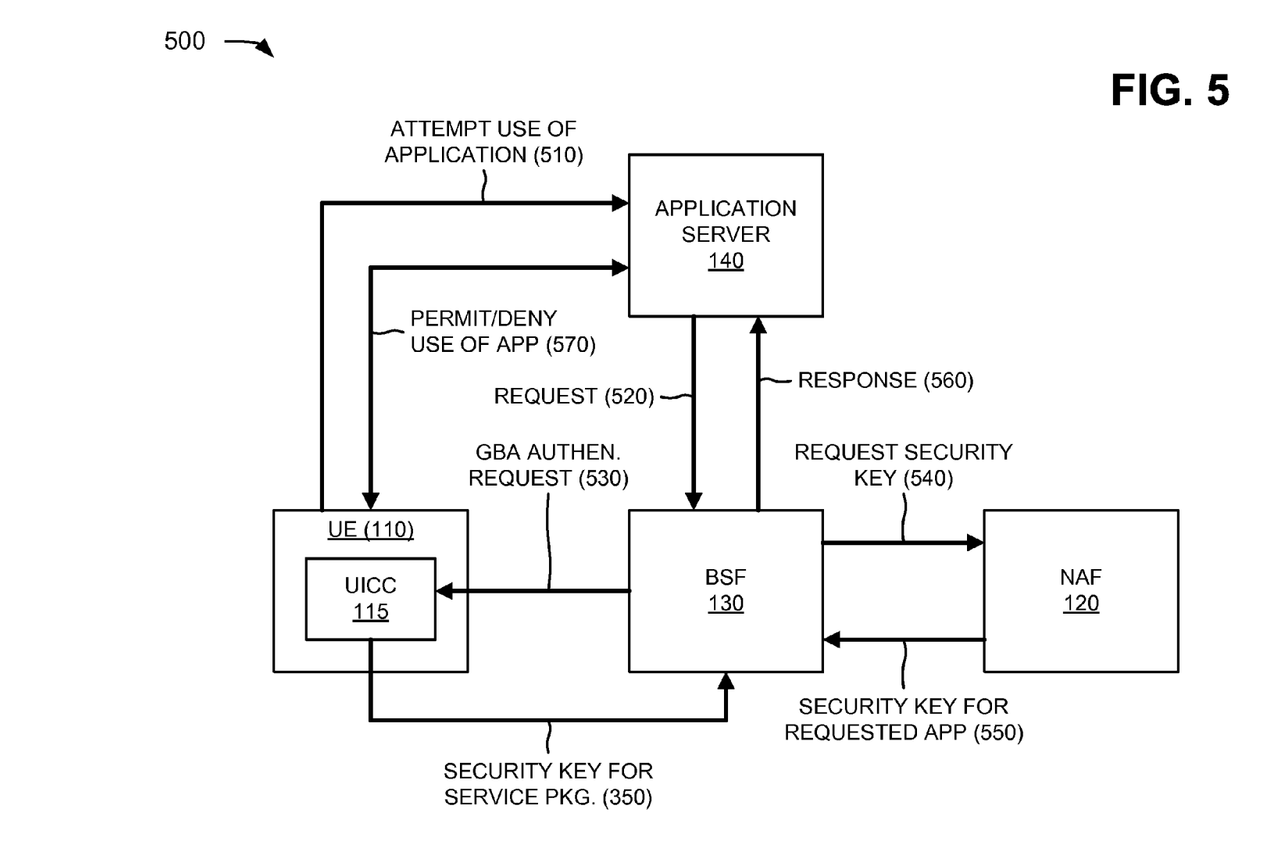
FIG. 5 is a diagram of example authentication operations capable of being performed by an example portion of the network of FIG. 1.

FIG. 5 is a diagram of example authentication operations capable of being performed by an example portion 500 of network 100 (FIG. 1). As shown in FIG. 5, network portion 500 may include UE 110, UICC 115, NAF 120, BSF 130, and application server 140. UE 110, UICC 115, NAF 120, BSF 130, and application server 140 may include the features described above in connection with one or more of, for example, FIGS. 1-4.

As further shown in FIG. 5, a user (not shown), via UE 110, may attempt to use an application provided by application server 140, as indicated by reference number 510. Based on requested use 510 of the application, application server 140 may generate a request 520 to use authentication services provided by BSF 130. Request 520 may include a request for authentication of UE 110, and may specify a type of authentication requested, an application identifier, an identifier for the user (e.g., a user identifier), a MEID of UE 110, etc. For example, request 510 may include a request for a GBA authentication of UE 110.

Application server 140 may provide request 520 to BSF 130, and BSF 130 may receive request 520. BSF 130 may authenticate the application if the application is trusted. The application may include registered credentials for application authentication and/or other data for authentication. If the application is trusted, BSF 130 may provide a GBA authentication request 530 to UICC 115. GBA authentication request 530 may request UICC 115 to authenticate UE 110 using GBA authentication.

UICC 115 may receive GBA authentication request 530, and may provide security key 350 to BSF 130 in response to GBA authentication request 530. In one example, security key 350 may include a security key for a service package that includes the application that UE 110 is attempting to use. Alternatively, security key 350 may not be provided or may include a security key for s service package that does not include the application. BSF 130 may provide, to NAF 120, a request 540 for a security key based on the application identifier provided in request 520. NAF 120 may retrieve a security key 550 for the requested application based on request 540 (e.g., as identified by the application identifier), and may provide security key 550 to BSF 130. BSF 130 may authenticate UE 110 for use of the application based on security key 350 and/or based on security key 550. For example, BSF 130 may compare security key 350 with security key 550 to determine whether UE 110 is authenticated for use of the application. If security key 350 matches security key 550, BSF 130 may authenticate UE 110 for use of the application. Based on the authentication of UE 110, BSF 130 may generate a response 560 that may include a success or a failure of the authentication and/or additional information related to the authentication.

BSF 130 may provide response 560 to application server 140, and application server 140 may determine whether UE 110 is authenticated for the application based on response

560. For example, if response 560 indicates that UE 110 is authenticated for the application, application server 140 may permit the user, via UE 110, to use the application, as indicated by reference number 570. If response 560 indicates that UE 110 is not authenticated for the application, application server 140 may not permit the user to use the application, as further indicated by reference number 570.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more other tasks described as being performed by one or more other components of network portion 500.

Figure 6:
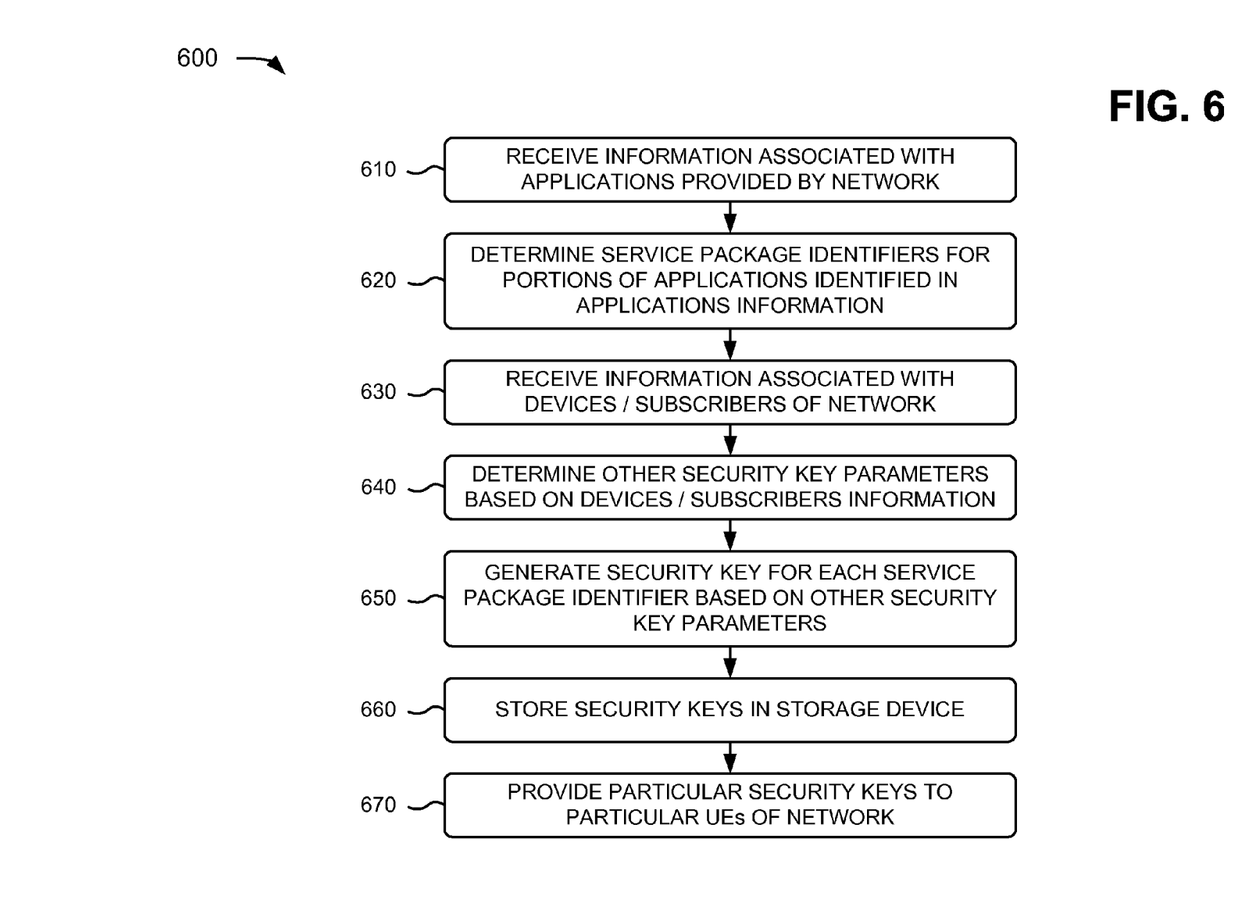
FIGS. 6-8 are flow charts of an example process for providing security key management based on service packaging according to an implementation described herein.
Figure 7:
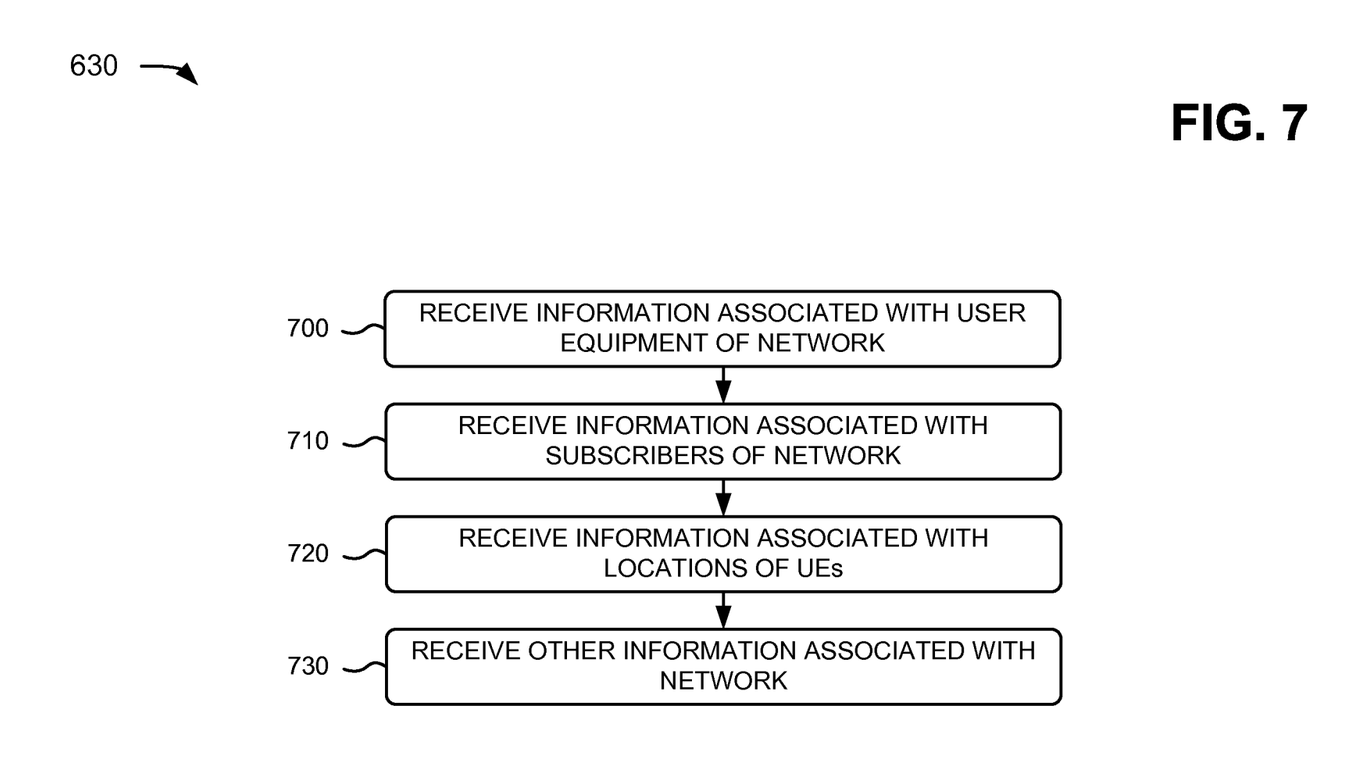
Figure 8:
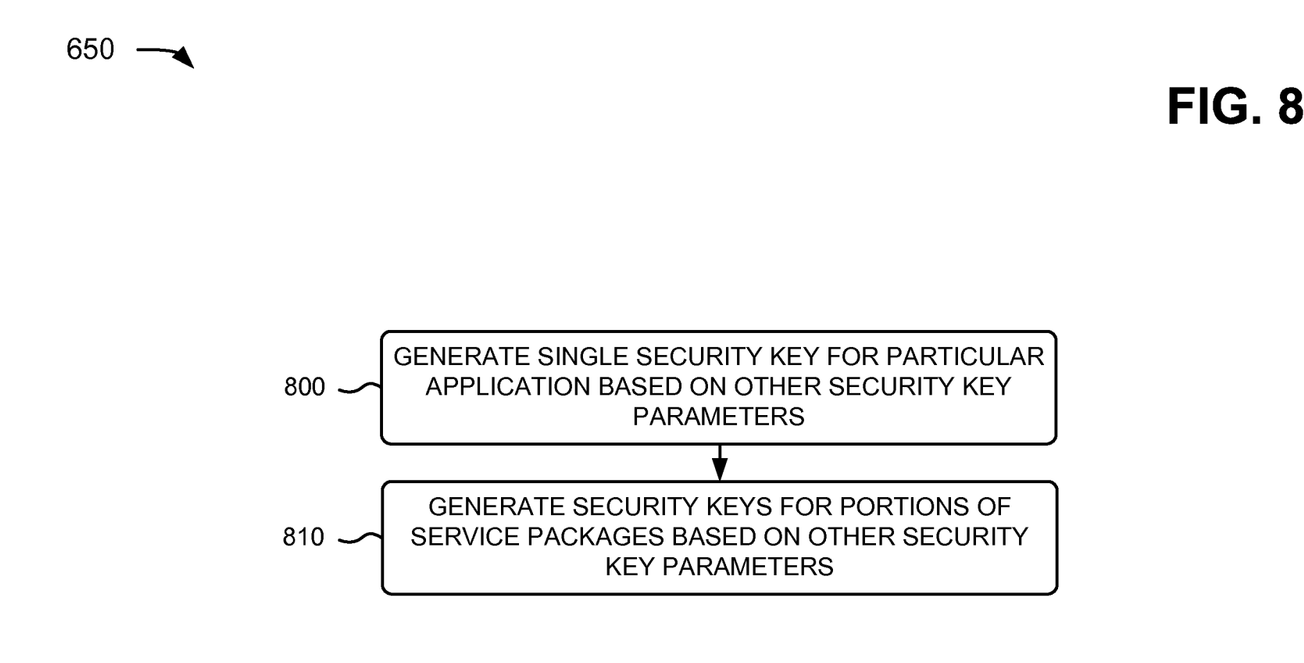

FIGS. 6-8 are flow charts of an example process 600 for providing security key management based on service packaging according to an implementation described herein. In one implementation, process 600 may be performed by BSF 130. Alternatively, or additionally, some or all of process 600 may be performed by another device or group of devices, including or excluding BSF 130.

As shown in FIG. 6, process 600 may include receiving information associated with applications provided by a network (block 610), and determining service package identifiers for portions of applications identified in the applications information (block 620). For example, in an implementation described above in connection with FIG. 3, application servers 140 may provide applications information 340 to BSF 130, and BSF 130 may receive applications information 340. Applications information 340 may include information associated with applications that determine locations of mobile communication devices (e.g., UE 110), applications that connect calls between UE 110 and other UEs 110, voicemail applications, messaging applications, video applications, and/or any other applications, services, and/or network resources provided by a service provider for one or more networks. BSF 130 may group one or more applications, identified in applications information 340, into a service package to be provided to one or more users (e.g., UEs 110). BSF 130 may associate a service package ID with each service package created by BSF 130 for one or more applications.

As further shown in FIG. 6, process 600 may include receiving information associated with devices and/or subscribers in the network (block 620), and determining other security parameters based on the devices/subscribers information (block 1330). For example, in an implementation described above in connection with FIG. 3, subscriber information 310 may include information associated with a user (e.g., of UE 110), such as a subscriber identification, a subscriber name, a subscriber address, subscriber account information, etc. UE information 320 may include an identifier of UE 110 (e.g., a MEID, IMEI, etc.); attachment point information (e.g., a connection point of UE 110 to network 160); a geographical location of UE 110; a zip code associated with UE 110; a type (e.g., a brand, a manufacturer, etc.) of UE 110; UE 110 capabilities (e.g., a screen size of UE 110, whether UE 110 can display high definition (HD) or three-dimensional (3D) content, etc.); etc. Other subscribers/UEs information 330 may include information (e.g., metadata) about other UEs 110, users of other UEs 110, connection points of other UEs 110 (e.g., to network 160), etc. BSF may receive information 310-330. BSF 130 may determine other security key parameters for the KDF based on subscriber information 310, UE information 320, and/or other subscribers/UEs information 330.

Returning to FIG. 6, process 600 may include generating a security key for each service package identifier based on the other security key parameters (block 650). For example, in an implementation described above in connection with FIG. 5, BSF 130 may generate a security key (e.g., a GBA key) for each service package ID based on the determined other security key parameters. In one example, BSF 130 may generate security keys for each of the special applications designated by BSF 130, and may provide the security keys for the special applications to NAF 120, as indicated by reference number 360. BSF 130 may generate security keys for the service packages defined by BSF 130, and may provide the security keys for the service packages to NAF 120, as indicated by reference number 370. BSF 130 may generate security keys for the service sub-packages defined by BSF 130, and may provide the security keys for the service sub-packages to NAF 120, as indicated by reference number 380.

As further shown in FIG. 6, process 600 may include storing the security keys in a storage device (block 660), and providing particular security keys to particular user equipment of the network (block 670). For example, in an implementation described above in connection with FIG. 3, BSF 130 may provide security keys 360 for the special applications, security keys 370 for the service packages, and security keys 380 for the service sub-packages to NAF 120, and NAF 120 may store security keys 360-380 in a storage device (e.g., storage device 250) referred to as a NAF Key Center. Alternatively, or additionally, BSF 130 may store security keys 360-380 in a storage device (e.g., storage device 250) associated with BSF 130. BSF 130 and/or NAF 120 may provide one or more of security keys 360-380 to one or more UICCs 115 associated with one or more UEs 110.

Process block 630 may include the process blocks depicted in FIG. 7. As shown in FIG. 7, process block 640 may include receiving information associated with user equipment of the network (block 700), receiving information associated with subscribers of the network (block 710), receiving information associated with locations of user equipment (block 720), and/or receiving other information associated with the network (block 730). For example, in an implementation described above in connection with FIGS. 3 and 4, subscriber information 310 may include information associated with a user (e.g., of UE 110), such as a subscriber identification, a subscriber name, a subscriber address, subscriber account information, etc. UE information 320 may include an identifier of UE 110 (e.g., a MEID, IMEI, etc.); attachment point information (e.g., a connection point of UE 110 to network 160); a geographical location of UE 110; a zip code associated with UE 110; a type (e.g., a brand, a manufacturer, etc.) of UE 110; UE 110 capabilities (e.g., a screen size of UE 110, whether UE 110 can display high definition (HD) or three-dimensional (3D) content, etc.); etc. Other subscribers/UEs information 330 may include information about other UEs 110, users of other UEs 110, connection points of other UEs 110 (e.g., to network 160), etc. Location information 460 may include information associated with physical locations (e.g., GPS locations) of one or more UEs 110. Other information 470 may include information obtained from accounting systems, billing systems, marketing systems, etc. associated with network 100. BSF may receive subscriber information 310, UE information 320, other subscribers/UEs information 330, location information 460, and/or other information 470.

Process block 650 may include the process blocks depicted in FIG. 8. As shown in FIG. 8, process block 650 may include generating a single security key for a particular application based on the other security key parameters (block 800), and generating security keys for portions of the service packages based on the other security key parameters (block 810). For example, in an implementation described above in connection with FIG. 3, BSF 130 may generate security keys for each of the special applications designated by BSF 130, and may provide the security keys for the special applications to NAF 120, as indicated by reference number 360. Alternatively, or additionally, BSF 130 may generate security keys for the service sub-packages defined by BSF 130, and may provide the security keys for the service sub-packages to NAF 120, as indicated by reference number 380.

Systems and/or methods described herein may simplify management of security keys (e.g., GBA keys) used for a variety of applications and/or services provided by a variety of networks (e.g., LTE networks, HRPD networks, eHRPD networks, 1xEV-DO networks, etc.). In one example implementation, the systems and/or methods may simplify management of security keys by grouping one or more applications into a specific service package, and generating a security key for the specific service package rather than for each application. For example, the systems and/or methods may group certain applications offered to subscribers (e.g., VoIP applications) into a service package, and may group other applications (e.g., messaging applications, video applications, gaming applications, music applications, network offload applications, etc.) into corresponding service packages. Alternatively, or additionally, the systems and/or methods may group one or more different applications (e.g., VoIP applications and gaming applications) into a single service package. The systems and/or methods may generate a security key for each of the generated service packages.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13 and 14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code--it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, application information associated with a plurality of applications for providing a plurality of services offered by a service provider via a network;
   grouping, by the device and based on the application information, the plurality of applications into a plurality of service packages,
      each service package, of the plurality of service packages, including more than one of the plurality of applications,
      the more than one of the plurality of applications each providing a different service offered by the service provider,
         the more than one of the plurality of applications in a particular service package, of the plurality of service packages, including a particular application, of the plurality of applications, for providing a particular service of the plurality of services;
   determining, by the device, a service package identifier for each service package, of the plurality of service packages,
      a particular service package identifier identifying the particular service package; and
   generating, by the device, a security key for each service package, of the plurality of service packages, based on the service package identifier for each package,
      a respective service package identifier being used as a security key parameter for a key derivation function used to generate a respective security key for a respective service package,
      a particular security key being generated for the particular service package;
   providing, by the device, the particular security key to a user device associated with the particular service package; and
   determining, by the device, whether the user device is authenticated to use the particular application based on comparing the particular security key, generated based on the particular service package identifier, to another security key for the particular application.

2. The method of claim 1, where grouping the plurality of applications into the plurality of service packages includes:
   grouping voice over Internet protocol applications into a first service package, and
   grouping, into another service package, one or more of:
      messaging applications,
      video applications,
      gaming applications,
      music applications, or
      network offload applications.

3. The method of claim 1, further comprising one of:
   storing the security key generated for each service package in a storage device associated with the device; or
   providing the security key generated for each service package to a network application function (NAF) device.

4. The method of claim 1, where the security key for each service package is
   a generic bootstrapping architecture (GBA) key.

5. The method of claim 1, where the application information associated with the plurality of applications includes information identifying one or more locations associated with accessing the one or more services included in the particular service package, and
   where generating the security key for each service package includes:

incorporating location information associated with the one or more locations into one or more other security key parameters for the key derivation function to cause the particular security key generated for the particular service package to be valid only for the one or more locations.

6. The method of claim 1, further comprising:
receiving, from an application server, a request to authenticate a the user device based on the user device attempting to access the particular service via the application server;
receiving, from the user device, the security key;
where determining whether the user device is authenticated to use the particular application includes determining whether the user device is authenticated to use the particular application to access the particular service based on the request and the security key received from the user device; and
sending, to the application server, a response to the request, the response indicating whether the user device is authorized to access the particular service.

7. The method of claim 1, further comprising:
dividing a service package, of the service packages, into a plurality of service sub-packages,
each service sub-package, of the plurality of service sub-packages,
including at least one of the more than one of the plurality of applications included in the service package;
associating a service sub-package identifier with each service sub-package; and
generating, based on the service sub-package identifier associated with each service sub-package, a security key for each service sub-package.

8. The method of claim 1, where the particular service package includes at least two of:
an application for Internet access,
an application for telephone service, or
an application for telephone service.

9. A device, comprising:
a memory; and
a processor to:
receive application information associated with a plurality of applications for providing a plurality of services offered by a service provider via a network;
group, based on the application information, the plurality of applications into a plurality of service packages, each service package, of the plurality of service packages, including more than one of the plurality of applications,
the more than one of the plurality of applications each providing a different service offered by the service provider,
create a service package identifier for a service package of the plurality of service packages;
generate a security key for the service package based on the service package identifier for the service package, the service package identifier being used as a security key parameter for a key derivation function used to generate the security key;
provide the security key to a user device associated with the service package;
determine whether the user device is authenticated to use an application, of the plurality of applications, based on comparing the security key, generated based on the service package identifier, to another security key for the application.

10. The device of claim 9, where, when grouping the plurality of applications, the processor is further to:
group one or more service packages, of the plurality of service packages, based on a data plan associated with a user.

11. The device of claim 9, where the security key is a generic bootstrapping architecture (GBA) key.

12. The device of claim 8, where the processor is further to:
receive information associated with user equipment associated with the network, and
where, when generating the security key for the service package, the processor is to:
incorporate an identifier associated with the user equipment into one or more other security key parameters, and
generate the security key using the one or more other security key parameters and the key derivation function,
the security key being valid only for the user equipment based on incorporating the identifier into the one or more other security key parameters.

13. The device of claim 9, where the processor is further to:
associate a special application identifier with a first application, of the plurality of applications based on the application information; and
generate a single security key for the first application using the special application identifier as the security key parameter for the key derivation function.

14. The device of claim 9, where the processor is further to:
divide a particular service package, of the plurality of service packages, into service sub-packages,
where each of the service sub-packages includes at least one of the more than one of the plurality of applications included in the particular service package, associate a service sub-package identifier with each of the service sub-packages, and
generate a security key for each of the service sub-packages using the associated service sub-package identifier as the security key parameter for the key derivation function.

15. The device of claim 9, where the device comprises one of a bootstrapping server function (BSF) device or a network application function (NAF) device.

16. A non-transitory computer-readable medium storing instructions, the instructions comprising:
one or more instructions that, when executed by a processor of a device, cause the processor to:
receive application information associated with a plurality of applications for providing a plurality of services offered by a service provider via a network;
group the plurality of applications into a plurality of service packages based on the application information,
each service package, of the plurality of service packages,
including more than one of the plurality of applications,
the more than one of the plurality of applications each providing a different service offered by the service provider,
assign a respective service package identifier to each service package of the plurality of service packages;
generate a respective security key for each service package, of the plurality of service packages, based on a respective security package identifier assigned to the a respective service package, the respective service package identifier being used as a security key parameter for a key derivation function used to generate the respective security key;
provide a security key, generated based on a security package identifier assigned to a service package, to a user device associated with the service package; and
determine whether the user device is authenticated to use an application, of the plurality of applications, based on comparing the security key, generated based on the service package identifier, to another security key for the application.

17. The non-transitory computer-readable medium of claim 16, where the instructions further comprise:
one or more instructions that, when executed by the processor of the device, cause the processor to one of:
store the security key generated for each service package in a storage device associated with the device, or
provide the security key generated for each service package to a network application function (NAF) device.

18. The non-transitory computer-readable medium of claim 16, where
the security key is a generic bootstrapping architecture (GBA) key.

19. The non-transitory computer-readable medium of claim 16, where the instructions further comprise:
one or more instructions that, when executed by the processor of the device, cause the one or more processor to:
receive information associated with subscribers associated with the network,
where the information associated with the subscribers includes at least one of:
information associated with user equipment associated with the subscribers, or
information associated with locations of the user equipment;
determine another security key parameter based on the information associated with the subscribers; and
where the one or more instructions to generate the security key include:
one or more instructions that, when executed by the processor of the device, cause the processor to:
generate the security key based on the security key parameter and the other security key parameter.

20. The non-transitory computer-readable medium of claim 16, where the one or more instructions to generate the security key for each service package include:
one or more instructions that, when executed by the processor of the device, cause the processor to one of:
generate, based on the security key parameter, a single security key associated with each service package.

21. The non-transitory computer-readable medium of claim 16, where the instructions further comprise:
one or more instructions that, when executed by the processor of the device, cause the processor to one of:
divide a particular service package, of the plurality of service packages into a plurality of service sub-packages based on the application information,
each service sub-package, of the plurality of service sub-packages, including at least one of the more than one of the plurality of applications included in the particular service package,
associate a service sub-package identifier with each of the service sub-packages, and
generate a security key for each service sub-package, of the plurality of service sub-packages, using the associated service sub-package identifier as the security key parameter.

\* \* \* \* \*